US011128253B1

United States Patent
Colby

(10) Patent No.: US 11,128,253 B1
(45) Date of Patent: Sep. 21, 2021

(54) ROTOR RESISTANCE BASED MOTOR THERMAL PROTECTION

(71) Applicant: Schneider Electric USA, Inc., Andover, MA (US)

(72) Inventor: Roy Stephen Colby, Raleigh, NC (US)

(73) Assignee: Schneider Electric USA, Inc., Boston, MA (US)

( * ) Notice: Subject to any disclaimer, the term of this patent is extended or adjusted under 35 U.S.C. 154(b) by 6 days.

(21) Appl. No.: 16/826,152

(22) Filed: Mar. 20, 2020

(51) Int. Cl.
*H02P 29/66* (2016.01)

(52) U.S. Cl.
CPC .................... *H02P 29/666* (2016.11)

(58) Field of Classification Search
CPC .......... G01R 31/34; G01R 31/28; G01K 7/32; G01K 17/00; G01K 7/346; G01P 5/10; G01P 13/006; H02P 1/00; H02P 1/04; H02P 1/26; H02P 1/24; H02P 1/42; H02P 1/46; H02P 1/465; H02P 1/54; H02P 3/00; H02P 3/08; H02P 8/28; H02P 21/00; H02P 21/0003; H02P 21/22; H02P 25/062; H02P 23/07; H02P 27/00; H02P 27/04; H02P 27/06
USPC ....................................................... 318/471
See application file for complete search history.

(56) References Cited

U.S. PATENT DOCUMENTS

| 4,914,386 | A  | * | 4/1990  | Zocholl  | G01R 31/343 |
|-----------|----|---|---------|----------|-------------|
|           |    |   |         |          | 174/DIG. 16 |
| 7,570,074 | B2 | * | 8/2009  | Gao      | H02P 23/14  |
|           |    |   |         |          | 324/765.01  |
| 8,339,085 | B2 | * | 12/2012 | Feldstein | E06B 9/42  |
|           |    |   |         |          | 318/470     |
| 9,496,817 | B1 | * | 11/2016 | Lepka    | H02P 29/67  |

OTHER PUBLICATIONS

A.M. Zyuzev and V.P. Metel'Kov; "Toward the Evaluation of the Thermal State of an Induction Motor in the Recursive Short-Term Mode"; Russian Electrical Engineering, 2014, vol. 85, No. 9; 2 pages.

* cited by examiner

*Primary Examiner* — Antony M Paul
(74) *Attorney, Agent, or Firm* — Locke Lord LLP

(57) ABSTRACT

Motor overload protection device is equipped with a thermal monitor that can determine expected rotor temperature rise from rotor resistance estimates. The thermal monitor determines expected rotor temperature rise by using a correlation between rotor temperature rise computed from rotor resistance estimates, and motor thermal state estimates. The correlation can be derived by fitting a line to a plurality of points, with each point defined by an ordered pair composed of a rotor temperature rise estimate and a corresponding motor thermal state estimate, and determining a slope of the line. This rotor temperature slope can then be used by the thermal monitor to determine a rotor temperature rise given a rotor resistance estimate and a corresponding motor thermal state estimate. If the rotor temperature rise exceeds an expected rotor temperature rise by more than a predefined threshold, the thermal monitor issues an alarm and/or takes corrective actions in some embodiments.

20 Claims, 13 Drawing Sheets

Partially obstructed cooling fan: stator & rotor temperature rise, and overload thermal state Fully obstructed cooling fan: stator & rotor temperature rise, and overload thermal state

ROTOR RESISTANCE BASED MOTOR THERMAL PROTECTION

TECHNICAL FIELD

The present disclosure relates to induction motors and particularly to methods and systems for monitoring and protecting such motors from thermal overload based on rotor resistance estimates.

BACKGROUND

Induction motors are widely used in industrial applications owing to their low cost and high efficiency and reliability, among other benefits. A typical induction motor includes a stationary member, or stator, having a plurality of windings thereon and a rotating member, or rotor, rotatably disposed within the stator. Applying a sinusoidal or alternating voltage to the stator windings induces a rotating magnetic field that causes the rotor to rotate. Induction motors typically operate on single-phase and three-phase voltages, although two-phase induction motors are also available.

Most induction motors employ an overload protection device that protects the motors from overcurrent, thermal overload, and the like. The overload protection device detects excessive current or heating in the motor and interrupts power to the motor to prevent damage from occurring. These devices, which may include circuit breakers, overload relays, and other types of circuit interruption devices, often have resistive elements connected in series with the power supply lines to the motor. When the resistive elements become too hot, the overload protection device cuts power to the motor.

While a number of advances have been made in the field of induction motor thermal overload protection, it will be readily appreciated that improvements are continually needed.

SUMMARY

Embodiments of the present disclosure relate to systems and methods for monitoring and protecting induction motors from thermal overload conditions. The method and system provide a motor overload protection device equipped with a thermal monitor that can determine an expected rotor temperature rise from rotor resistance estimates. The thermal monitor determines the expected rotor temperature rise by using a relationship, or correlation, between rotor temperature rise estimates based on rotor resistance estimates, and motor thermal state estimates. The relationship, or correlation, can be derived by fitting a line to a plurality of points, each point defined by an ordered pair composed of a rotor temperature rise estimate and a corresponding motor thermal state estimate, and determining a slope of the line. This slope, which may be referred to as a rotor temperature slope, can then be used by the thermal monitor to determine a rotor temperature rise given a rotor resistance estimate and a corresponding motor thermal state estimate. If the rotor temperature rise exceeds an expected rotor temperature rise by more than a predefined threshold, then the thermal monitor issues an alarm and/or takes corrective actions in some embodiments.

In general, in one aspect, embodiments of the present disclosure relate to a method of protecting an induction motor from thermal overload conditions. The method comprises, among other things, computing rotor temperature rise estimates from rotor resistance estimates for the induction motor, and computing motor thermal state estimates for the induction motor. The method also comprises deriving a correlation between the thermal state estimates and the rotor temperature rise estimates, and computing a new temperature rise estimate from a new rotor resistance estimate for the induction motor. The method further comprises computing a new motor thermal state estimate for the induction motor, and computing an expected rotor temperature rise for the induction motor using the correlation and the new motor thermal state. The method then comprises checking whether the new temperature rise estimate exceeds the expected rotor temperature rise by more than a predefined threshold rotor temperature rise for the induction motor, and performing a corrective action in response to the new temperature rise estimate exceeding the expected rotor temperature rise by more than the predefined threshold rotor temperature rise.

In accordance with one or more of the foregoing embodiments, the rotor resistance estimates are obtained from a real part of a complex motor input admittance and a slip value of the induction motor, and the complex motor input admittance is determined from motor voltage and current in a synchronous reference frame with the motor voltage oriented on a Q-axis of the synchronous reference frame. In accordance with one or more of the foregoing embodiments, deriving the correlation comprises fitting a line to a plurality of points, each point defined by an ordered pair composed of a rotor temperature rise estimate and a corresponding motor thermal state estimate, and determining a slope of the line. In accordance with one or more of the foregoing embodiments, computing an expected rotor temperature rise for the induction motor comprises applying the slope to the new motor thermal estimate, performing a corrective action comprises one or more of cutting power to the induction motor and issuing an alarm, and computing an expected rotor temperature rise for the induction motor is performed in one of a motor overload protection device or an edge device.

In general, in another aspect, embodiments of the present disclosure relate to a device for protecting an induction motor from thermal overload conditions. The device comprises, among other things, a processor and a storage unit communicatively coupled to the processor. The storage unit stores computer-readable instructions thereon for causing the processor to, among other things, compute a temperature rise estimate from a rotor resistance estimate for the induction motor, and compute a motor thermal state estimate for the induction motor. The computer-readable instructions also cause the processor to compute an expected rotor temperature rise for the induction motor, and check whether the temperature rise estimate exceeds the expected rotor temperature rise by more than a predefined threshold rotor temperature rise for the induction motor. The computer-readable instructions further cause the processor to perform a corrective action in response to the temperature rise estimate exceeding the expected rotor temperature rise by more than the predefined threshold rotor temperature rise.

In accordance with any one or more of the foregoing embodiments, the computer-readable instructions further cause the processor to obtain the rotor resistance estimate from a real part of a complex motor input admittance and a slip value of the induction motor, and cause the processor to determine the complex motor input admittance from motor voltage and current in a synchronous reference frame with the motor voltage oriented on a Q-axis of the synchronous reference frame. In accordance with any one or more of the foregoing embodiments, the computer-readable instructions further cause the processor to derive a correlation between thermal state estimates and rotor temperature rise estimates for the induction motor, and cause the processor to compute the expected rotor temperature rise by applying the correlation to the motor thermal estimate. In accordance with any one or more of the foregoing embodiments, the computer-readable instructions further cause the processor to performs the corrective action by performing one or more of cutting power to the induction motor and issuing an alarm, and the device is one of a motor overload protection device or an edge device.

In general, in yet another aspect, embodiments of the present disclosure relate to a non-transitory computer-readable medium containing program logic that. When executed by operation of one or more computer processors, the program logic causes the one or more computer processors to, among other things, compute rotor temperature rise estimates from rotor resistance estimates for an induction motor, and compute motor thermal state estimates for the induction motor. The program logic further causes the one or more processors to derive a correlation between the thermal state estimates and the rotor temperature rise estimates, compute a new motor thermal state estimate for the induction motor, and compute an expected rotor temperature rise for the induction motor using the correlation and the new motor thermal state. The program logic then causes the one or more processors to check whether the new temperature rise estimate exceeds the expected rotor temperature rise by more than a predefined threshold rotor temperature rise for the induction motor, and perform a corrective action in response to the new temperature rise estimate exceeding the expected rotor temperature rise by more than the predefined threshold rotor temperature rise.

In accordance with any one or more of the foregoing embodiments, the program logic further causes the one or more processors to obtain the rotor resistance estimates from a real part of a complex motor input admittance and a slip value of the induction motor, and further causes the one or more processors to determine the complex motor input admittance from motor voltage and current in a synchronous reference frame with the motor voltage oriented on a Q-axis of the synchronous reference frame. In accordance with any one or more of the foregoing embodiments, the program logic further causes the one or more processors derive the correlation by fitting a line to a plurality of points, each point defined by an ordered pair composed of a rotor temperature rise estimate and a corresponding motor thermal state estimate, and determining a slope of the line. In accordance with any one or more of the foregoing embodiments, the program logic further the one or more processors to compute the expected rotor temperature rise for the induction motor by applying the slope to the new motor thermal estimate, and perform the corrective action by performing one or more of cutting power to the induction motor and issuing an alarm.

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

DETAILED DESCRIPTION

This description and the accompanying drawings illustrate exemplary embodiments of the present disclosure and should not be taken as limiting, with the claims defining the scope of the present disclosure, including equivalents. Various mechanical, compositional, structural, electrical, and operational changes may be made without departing from the scope of this description and the claims, including equivalents. In some instances, well-known structures and techniques have not been shown or described in detail so as not to obscure the disclosure. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

At a high level, embodiments of the present disclosure provide a way to correlate motor temperature rise versus motor thermal state to detect abnormal motor temperature rise that may indicate impaired motor cooling. The embodiments provide systems and methods that use a simplified motor model to compute motor input admittance, estimate motor speed/slip from rotor slot harmonics, compute rotor temperature rise, and correlate rotor temperature rise with motor thermal state. These systems and methods may then be deployed in overload protection devices to monitor and protect induction motors from thermal overload conditions.

Figure 1A:
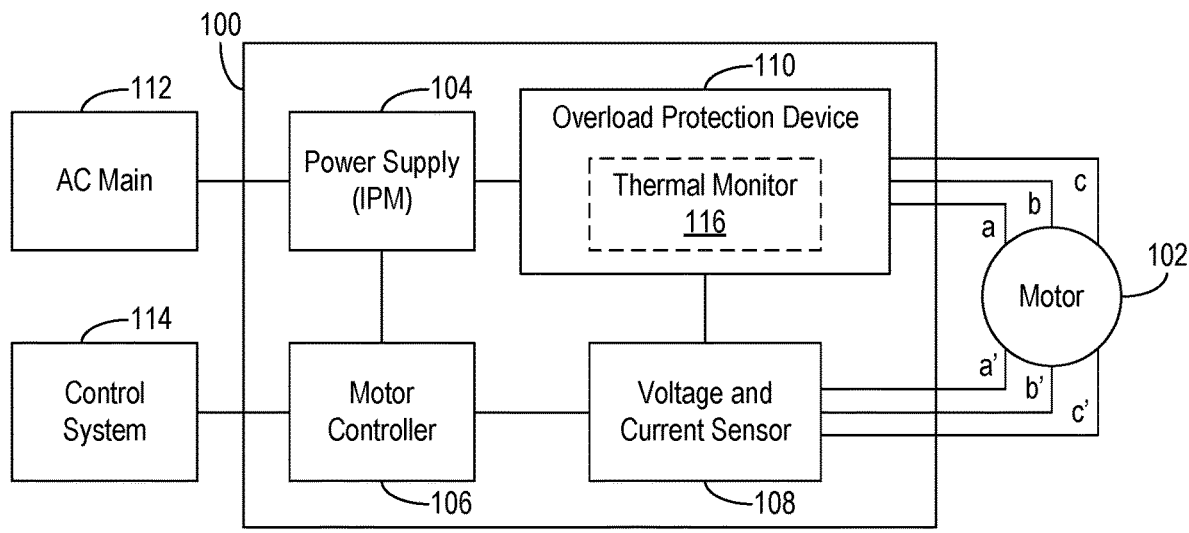
FIGS. 1A and 1B illustrate exemplary motor overload protection devices equipped with a thermal monitor according to embodiments of the present disclosure.

Referring now to FIG. 1A, a functional diagram of a motor management system 100 for an AC motor 102, such as an induction motor, is shown according to one or more embodiments disclosed herein. The motor 102 in this example is a typical three-phase induction motor having a stator (not expressly shown), a rotor (not expressly shown) rotatably disposed within the stator, and driven by three-phase line voltage and current having phases "a," "b," and "c." Although a three-phase motor is shown, it should be understood that a two-phase or other type of multiphase induction motor may also be used without departing from the scope of the disclosed embodiments.

As can be seen, the motor management system 100 has several components, including a power supply module 104, a motor controller 106, a voltage and current sensor 108, and an overload protection device 110. An AC mains 112 provides the voltage and current for the motor 102 via the power supply module 104, and an external control system 114 provides overall control of the motor 102 via the motor controller 106. This type of arrangement is commonly used in a variety of commercial and residential applications. In an HVAC system, for example, the motor 102 may be a fan motor that drives a fan for moving air through air ducts and the external control system 114 may be a thermostat that controls the HVAC system to maintain a desired temperature and humidity.

In general operation, the power supply module 104, which may be for example an Intelligent Power Module (IPM), converts AC voltage and current from the AC mains 112 into three-phase voltage and current needed for running the motor 102. The motor controller 106 is typically a microcontroller unit (MCU) programmed to control the power supply module 104 to produce the appropriate amplitudes and phase angles for the phase voltages and currents. These amplitudes and phase angles may be derived by the motor controller 106 using real-time or near real-time measurements of the actual phase voltages and currents in the motor 102 provided by the voltage and current sensor 108. Any suitable sensor 108 may be used, including a Hall effect sensor, current transformer, and the like, that is capable of measuring the phase voltages and currents in the motor 102 in real time or near real time. The overload protection device 110, which may be for example a circuit breaker, overload relay, and the like, disconnects or otherwise removes the power supply module 104 from the motor 102 upon detection of an overload condition in the motor 102.

In accordance with embodiments of the present disclosure, the overload protection device 110 comes equipped with a thermal monitor 116 that monitors and protects the motor 102 from thermal overload conditions. The thermal monitor 116, in general, operates on the observation that rotor resistance increases with rotor temperature, and that the increases tend to be linear. Therefore, rotor temperature, or rather the changes therein, can be estimated by estimating rotor resistance. In particular, a model can be established for rotor temperature rise under normal motor operating conditions using rotor resistance estimates obtained under those conditions. The model sets the expected rotor temperature rise, or the rise that would be expected, under normal motor operating conditions. The thermal monitor 116 can thereafter obtain rotor temperature rise estimates on a regular basis for the motor and determine whether any of these estimates exceeds the expected rotor temperature rise by more than a predefined threshold. If so, the thermal monitor 116 issues an alarm and/or takes corrective actions as needed, including immediately cutting power to the motor 102. The model can be established by the thermal monitor 116 within the overload protection device 110, or it can be established externally (e.g., as part of a motor characterization process) and the results provided to the overload protection device 110.

Figure 1B:
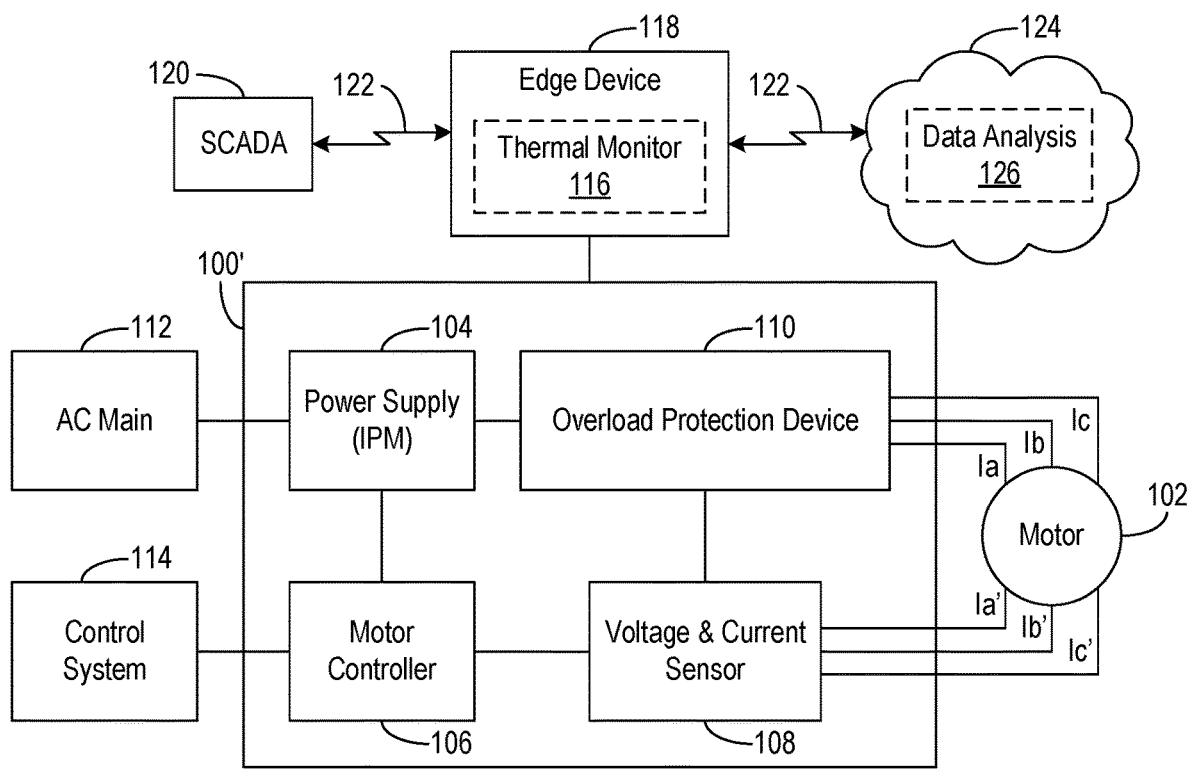

FIG. 1B shows a motor management system 100' in which the thermal monitor 116 resides in an edge device 118 connected to the system 100' instead of in the overload protection device 110. The edge device 118 provides an access or entry point for the motor management system 100' to communicate data collected about the motor 102 to an external system, such as a supervisory control and data acquisition (SCADA) system 120. The communication may take place over a communication link 122, which may be a wired or a wireless link, such as Wi-Fi, Bluetooth, GPRS, CDMA, satellite, and the like. The data may also be forwarded by the edge device 118 to other systems, including a cloud-based system 124 (which may be a private, enterprise cloud), for further processing by a data analysis service 126. Any type of edge device may be used as the edge device 118 as long as the device has sufficient processing capacity for the purposes discussed herein. Examples of suitable edge devices include gateways, routers, routing switches, integrated access devices (IADs), and various MAN and WAN access devices.

Figure 2:
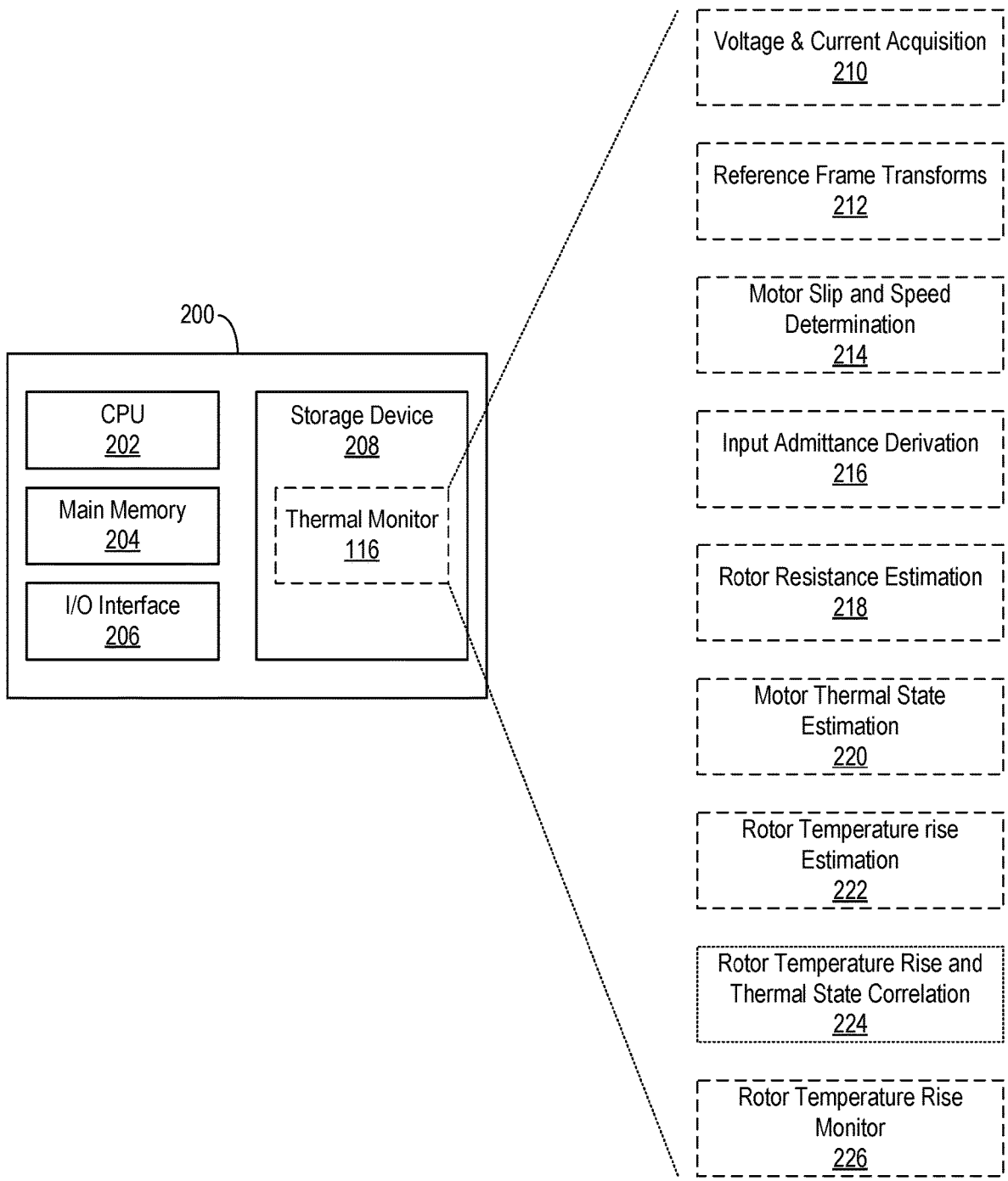
FIG. 2 illustrates exemplary thermal monitor according to embodiments of the present disclosure.

FIG. 2 illustrates an exemplary computing system 200 that may be used to implement the overload protection device 110 and/or the edge device 118. The exemplary computing system 200 has a typical system architecture that includes a CPU 202 communicatively coupled to a random-access memory (RAM) 204 or other dynamic storage device and an input/output interface 206 that allows the CPU 202 to communicate with external systems or networks. A computer-readable storage device 208, such as a nonvolatile memory (e.g., Flash drive) magnetic disk, and the like, is communicatively coupled to and stores programs and data for the CPU 202. These computing components 202-208 operate in a manner generally well known in the art and thus a detailed description is omitted here for economy.

Among the programs and computer-readable instructions residing on the storage device 208 are computer-readable instructions for the thermal monitor 116. In the example shown, the thermal monitor 116 has or is composed of a number of functions or modules that are depicted as discrete blocks. Those having ordinary skill in the art will of course understand that any one of the blocks may be divided into several constituent blocks and that two or more of the blocks may be combined into a single block as needed without departing from the scope of the disclosed embodiments.

In the FIG. 2 example, the thermal monitor 116 includes a voltage and current acquisition module 210 that operates to obtain samples of motor voltages and currents, and a reference frame transform module 212 that operates to transform the motor voltages and currents from a stationary reference frame to a rotating reference frame and subsequently to a synchronous reference frame. There is also a motor slip and speed module 214 that operates to determine the motor slips and speeds, and an input admittance module 216 that operates to derive motor input admittances. The thermal monitor 116 additionally includes a rotor resistance module 218 that operates to obtain rotor resistance estimates, and a motor thermal state module 220 that operates to obtain motor thermal state estimates for the motor 102. Also present are a rotor temperature rise module 222 that operates to obtain rotor temperature rise estimates, and a correlation module 224 that operates to correlate rotor temperature rise and motor thermal state. A rotor temperature rise monitor 226 operates to compare the rotor temperature rise estimates to an expected rotor temperature rise and take one or more actions if the difference exceeds a predefined threshold.

In some embodiments, the correlation module 224 is an optional module (indicated by dotted lines) that may be implemented separately from the thermal monitor 116, for example by the cloud-based data analysis service 128, and the correlation resulting therefrom is provided to the thermal monitor 116.

Figure 3A:
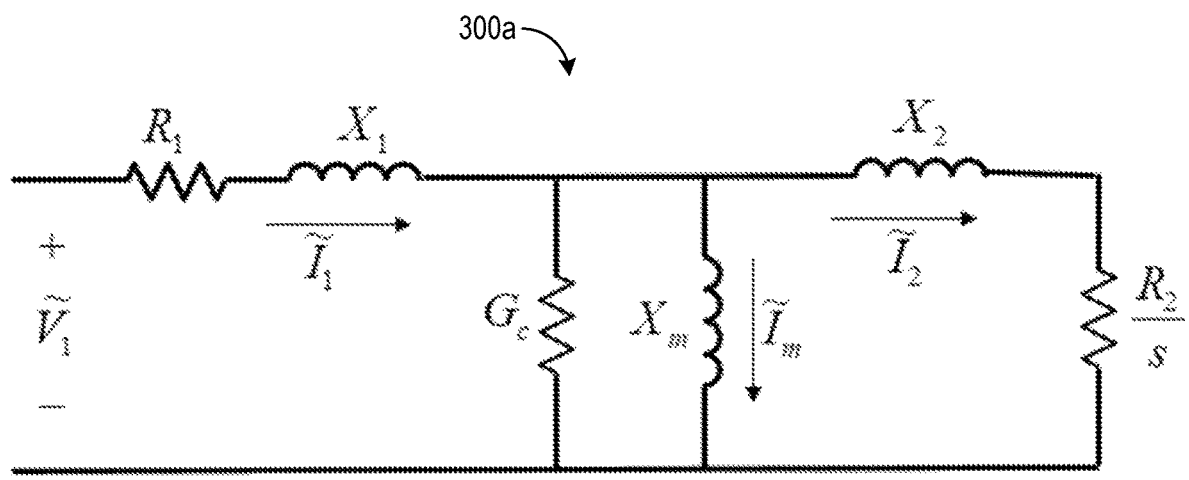
FIGS. 3A and 3B illustrates exemplary electrical circuit models for a motor according to embodiments of the present disclosure.
Figure 3B:
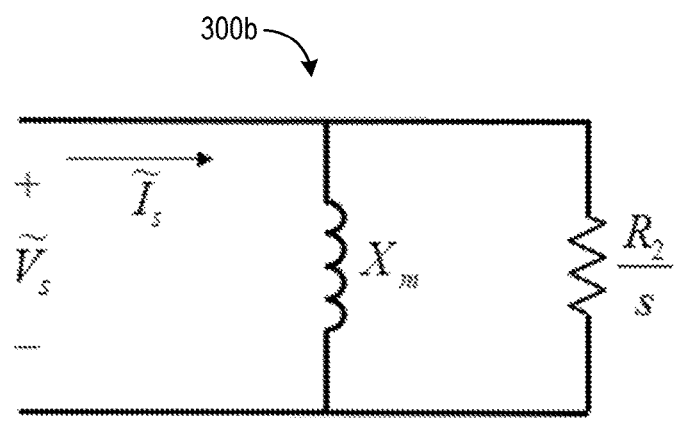

FIGS. 3A and 3B show circuit models 300a and 300b that help explain the basis of the operation of the thermal monitor 116. Referring first to FIG. 3A, the circuit model 300a represents an exemplary steady-state equivalent circuit for an AC motor, like the motor 102. In the model, $V_1$ is the motor input voltage, $R_1$ and $X_1$ represent stator resistance and leakage reactance, $I_1$ is the current through those components, $R_2$ and $X_2$ represent rotor resistance and leakage reactance, $I_2$ is the current through those components, $G_C$ represents a shunt resistance, $X_m$ and $I_m$ represent the magnetizing reactance and current, and s represent motor slip. In most motor applications, $R_1$, $X_1$ and $X_2$, and $G_C$ have values that are negligible relative to the values of the magnetizing reactance $X_m$ and rotor resistance $R_2$ and can thus be ignored. This results in the simplified equivalent circuit model 300b of FIG. 3B, where the negligible components $R_1$, $X_1$ and $X_2$, and $G_C$ have been omitted. The complex admittance Y for the motor may then be expressed as shown in Equation (1):

$$Y = Y_{real} + jY_{imag} = \frac{1}{\frac{R_2}{s}} - j\frac{1}{X_m} \quad (1)$$

As can be seen from Equation (1), the real part of the admittance $Y_{real}$ equals the inverse of the ratio of rotor resistance $R_2$ to motor slip s, while the imaginary part of the admittance $Y_{imag}$ equals the inverse of the magnetizing reactance $X_m$. The rotor resistance $R_2$ may thus be expressed in terms of motor slip s and the real part of the admittance $Y_{real}$, as shown in Equation (2):

$$R_2 = s / Y_{real} \quad (2)$$

Figure 4A:
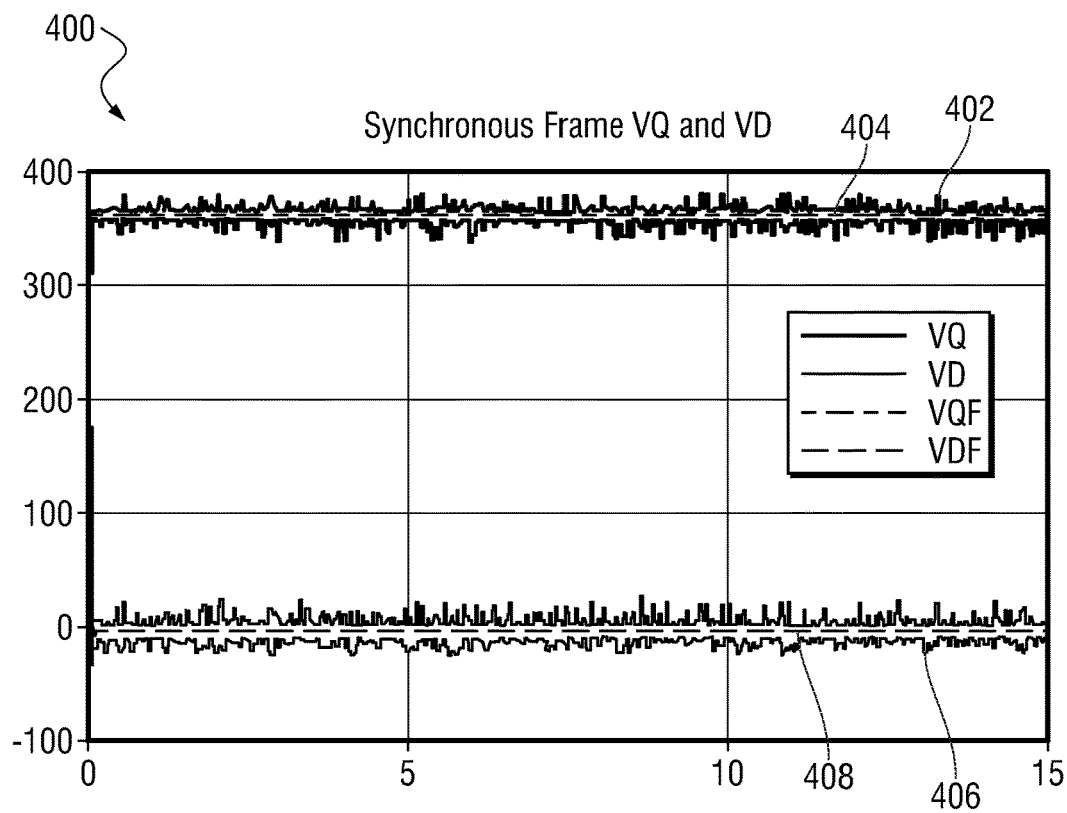
FIGS. 4A and 4B illustrate exemplary motor voltages and currents in a synchronous reference frame according to embodiments of the present disclosure.
Figure 4B:
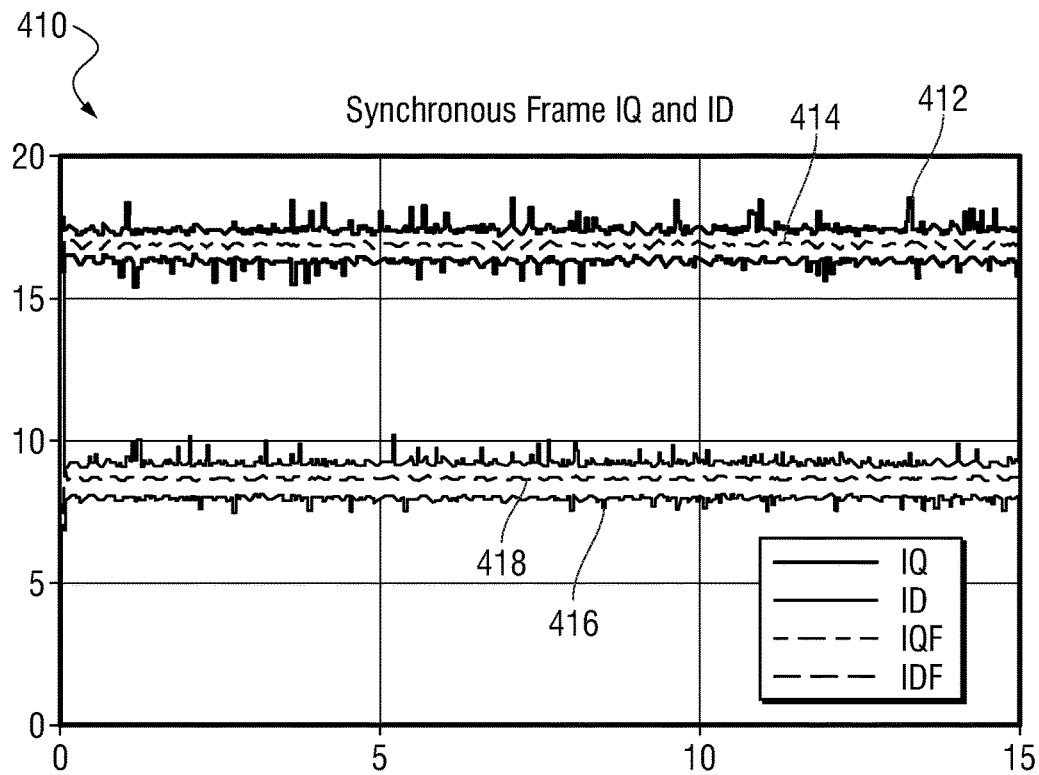

The real admittance $Y_{real}$, as well as the imaginary admittance $Y_{imag}$, can be determined from the motor voltages and currents. The motor voltages and currents, however, are three-phase time-varying signals $V_a$, $V_b$, $V_c$ and $I_a$, $I_b$, $I_c$ that are computationally difficult to analyze for motor control purposes. Analysis of these signals can be made more computationally manageable by transforming them into stationary voltages and currents $V_x$, $V_y$ and $I_x$, $I_y$ in a stationary reference frame (e.g., using the Clarke transform), as well known in the art. Further computational simplification can be achieved by transforming the stationary voltages and currents into quadrature (Q) and direct (D) voltages and current $V_Q$, $V_D$ and $I_Q$, $I_D$ in a synchronous reference frame (e.g., using the Park transform). Orienting the synchronous reference frame voltage vector ($V_Q$, $V_D$) to the Q-axis of the synchronous reference frame leaves the D-axis voltage $V_D$ with a zero average value, which allows that term to be conveniently omitted from the analysis. FIGS. 4A and 4B illustrate the synchronous reference frame voltages and currents mentioned above.

Referring to FIG. 4A, a voltage waveform capture 400 shows the motor voltages (or sampled data therefor) after transformation into the synchronous reference frame. In the example, waveform 402 is the quadrature voltage $V_Q$ and line 404 is a filtered and smoothed version of the quadrature voltage $V_{QF}$, while waveform 406 is the direct voltage $V_D$ and line 408 is a filtered and smoothed version of the direct voltage $V_{DF}$. As line 408 shows, orienting the synchronous reference frame voltage vector ($V_Q$, $V_D$) to the Q-axis leaves the direct voltage $V_D$ with a zero average value. In some embodiments, a phase-locked loop (PLL) or equivalent computational mechanism is used to orient the synchronous reference frame voltage vector (VQ, VD) to the Q-axis.

FIG. 4B shows a current waveform capture 410 for the motor currents (or sampled data therefor) resulting from transformation into the synchronous reference frame and orienting the voltage vector to the Q-axis. In the example, waveform 412 is the quadrature current IQ and line 414 is a filtered and smoothed version of the quadrature current $I_{QF}$, while waveform 416 is the direct current $I_D$ and line 418 is a filtered and smoothed version of the direct current $I_{DF}$. The real and imaginary admittances $Y_{real}$ and $Y_{imag}$ from Equation (1) can then be expressed in terms of the quadrature and direct voltages and currents (or the filtered versions thereof), as shown in Equations (3) and (4):

$$Y_{real} = \frac{I_Q}{V_Q} \quad (3)$$

$$Y_{imag} = \frac{I_D}{V_Q} \quad (4)$$

As for motor slip s, any one of several known techniques may be used to determine this quantity. In one example, motor slip s may be estimated by performing a Fast Fourier Transform (FFT) on the motor currents to convert the currents from time domain to frequency domain, then locating peak frequencies in the current frequency spectrum that correspond to rotor slot harmonics. The frequencies corresponding to the rotor slot harmonics may then be used to determine motor slip s according to the well-known relationship shown in Equation (5).

$$f_{sh} = \left(1 \pm k\frac{R}{p}(1-s)\right)f_1 \quad (5)$$

In Equation (5), $f_{sh}$ is a peak frequency corresponding to rotor slot harmonics, k is an integer representing the slot harmonic order (e.g., 1, 2, 3, etc.), R represents the number of slots (or bars) in the rotor, p represents the number of poles in the motor, and $f_1$ represents the AC mains frequency. The motor slip s may be determined from this equation, then used with the real admittance of the motor to obtain a rotor resistance $Y_{real}$ estimate according to Equation (2).

Figure 5:
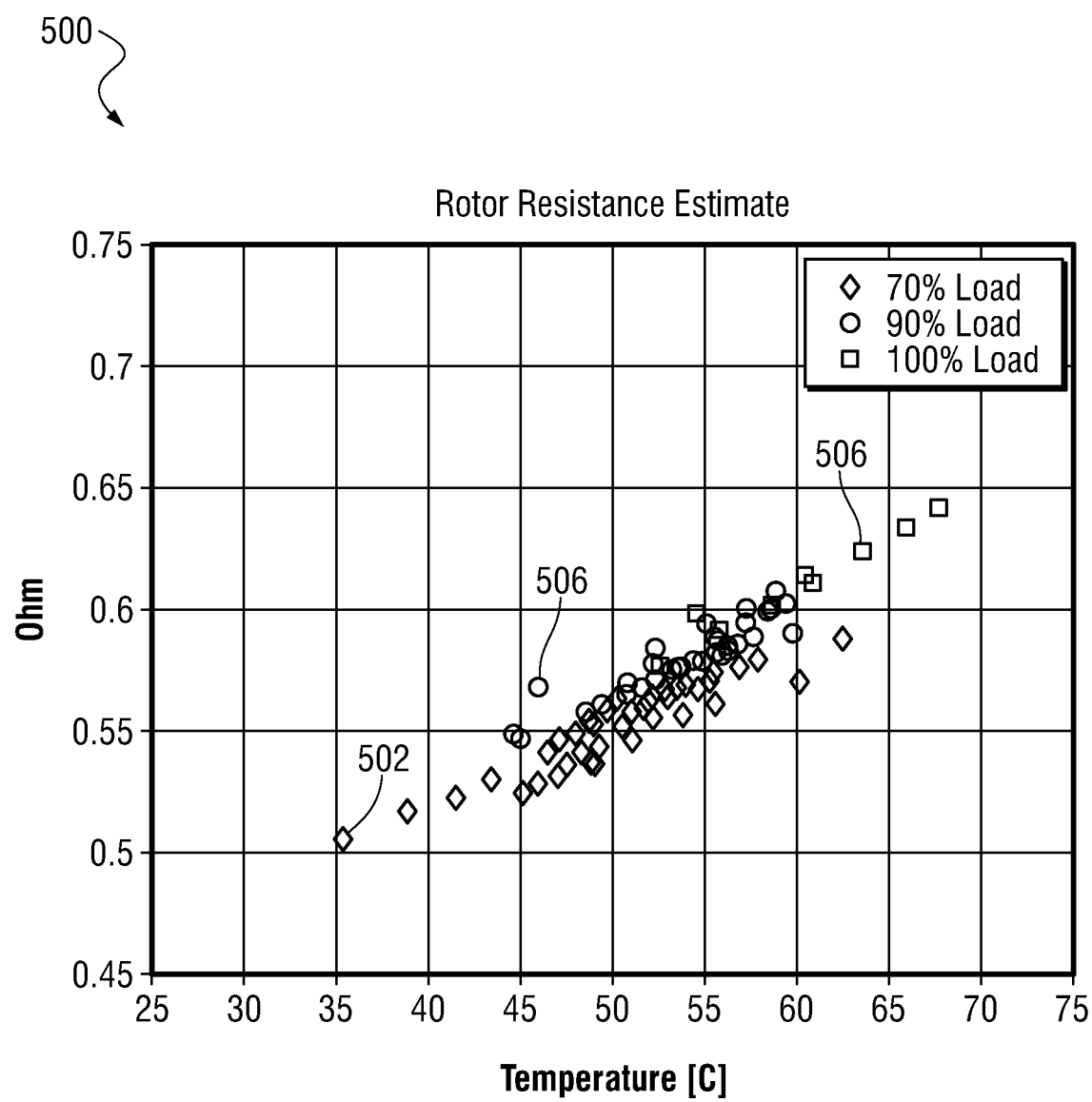
FIG. 5 illustrates a data plot showing exemplary rotor resistance estimates according to embodiments of the present disclosure.

FIG. 5 shows a plot 500 of rotor resistance estimates obtained according to Equation (2) for a particular 10-horsepower induction motor over a range of measured stator winding temperatures. In the plot, the horizontal axis represents measured stator winding temperature in degrees Celsius and the vertical axis represents rotor resistance in ohms. Data points labeled 502 represent rotor resistance estimates taken at 70% motor load, data points labeled 504 represent rotor resistance assessments taken at 90% motor load, and data points labeled 506 represent rotor resistance estimates taken at 110% motor. As can be seen, the rotor resistance estimates generally increase with stator temperature, and the increase tends to be linear. While stator temperature does not correlate exactly to rotor temperature (e.g., due to thermal lags between the different parts of the motor), the linear tracking between the rotor resistance estimates and the stator temperature strongly indicates that rotor resistance estimates may be validly used to obtain at least the changes in rotor temperature.

In some embodiments, the changes in rotor temperature, particularly rotor temperature rise $T_{rise}$, can be estimated using the relationship shown in Equation (6):

$$T_{rise} = \left(\frac{R_2}{R_{init}} - 1\right) \bigg/ \alpha \quad (6)$$

In Equation (6), $R_{init}$ is an initial or "cold" rotor resistance estimate obtained shortly after the motor is started and before the motor begins to warm, while α is a temperature coefficient of resistance for the particular metal of the motor (e.g., aluminum, copper, etc.). The thermal monitor 116 can thus obtain an estimate of rotor temperature rise $T_{rise}$ by obtaining an estimate of rotor resistance at any given point during motor operation. If the rotor temperature rise estimate exceeds an expected rotor temperature rise by more than a predefined threshold, the thermal monitor 116 can automatically raise an alarm and/or take corrective actions. In some embodiments, multiple predefined thresholds may be used, each threshold indicating a progressively higher level of thermal overload and resulting in a different corrective action. In this way, the thermal monitor 116 can provide a more granular approach to monitoring and protecting the motors from thermal overload conditions.

Figure 6:
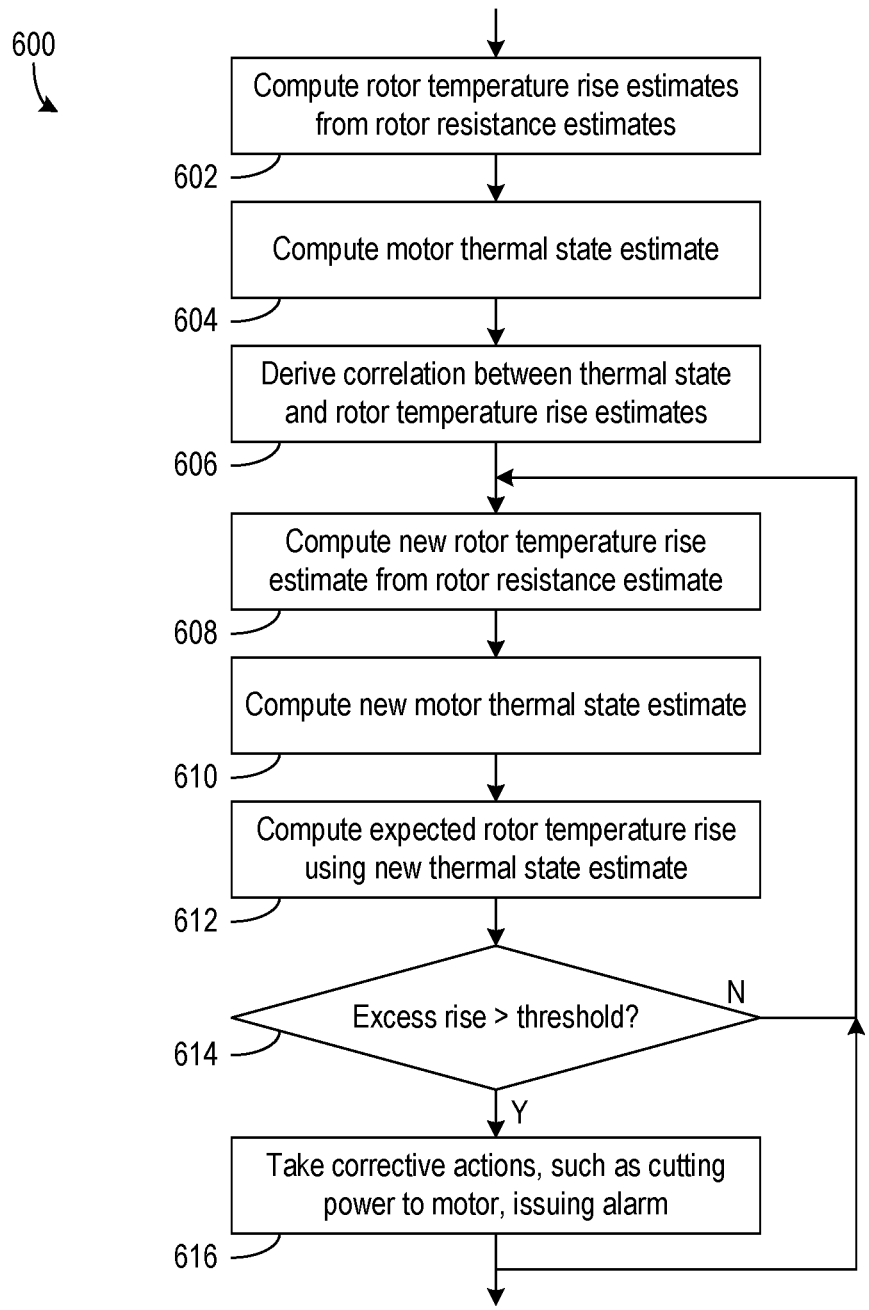
FIG. 6 illustrates a flow chart for an exemplary method of monitoring motor temperature according to embodiments of the present disclosure.

Turning now to FIG. 6, a flow chart is shown for a method 600 that may be used in conjunction with the thermal monitor 116. The method 600 generally begins at block 602 where rotor temperature rise estimates are computed from rotor resistance estimates under normal motor operating conditions. At block 604, motor thermal state estimates are obtained (computed) under normal motor operating conditions. At block 606, a correlation is derived or otherwise obtained between the thermal state estimates and rotor temperature rise estimates. The correlation may then be used as a basis to model rotor temperature rise under normal motor operating conditions for the motor. The thermal monitor 116 then compares new rotor temperature rise estimates with expected rotor temperature rise estimates as predicted by the model on an ongoing basis to monitor and detect potential thermal overload conditions, as shown at block 608.

At block 608, a new rotor temperature rise estimate is computed or obtained from a rotor resistance estimate, and at block 610, a new motor thermal state estimate is computed. An expected rotor temperature rise is then computed at block 612 using the new thermal state estimate and the correlation or model. At block 614, a determination is made whether the new rotor temperature rise estimate exceeds the expected rotor temperature rise by more than a predefined threshold. If no, then the method 600 returns to block 608 to continue monitoring for potential thermal overload conditions. If yes, then one or more corrective actions are taken, such as cutting power to the motor, issuing an alarm, and the like, at block 616. The method 600 may thereafter proceed with further processing or return to block 608 to continue monitoring for potential thermal overload conditions, depending on the particular application.

Figure 7:
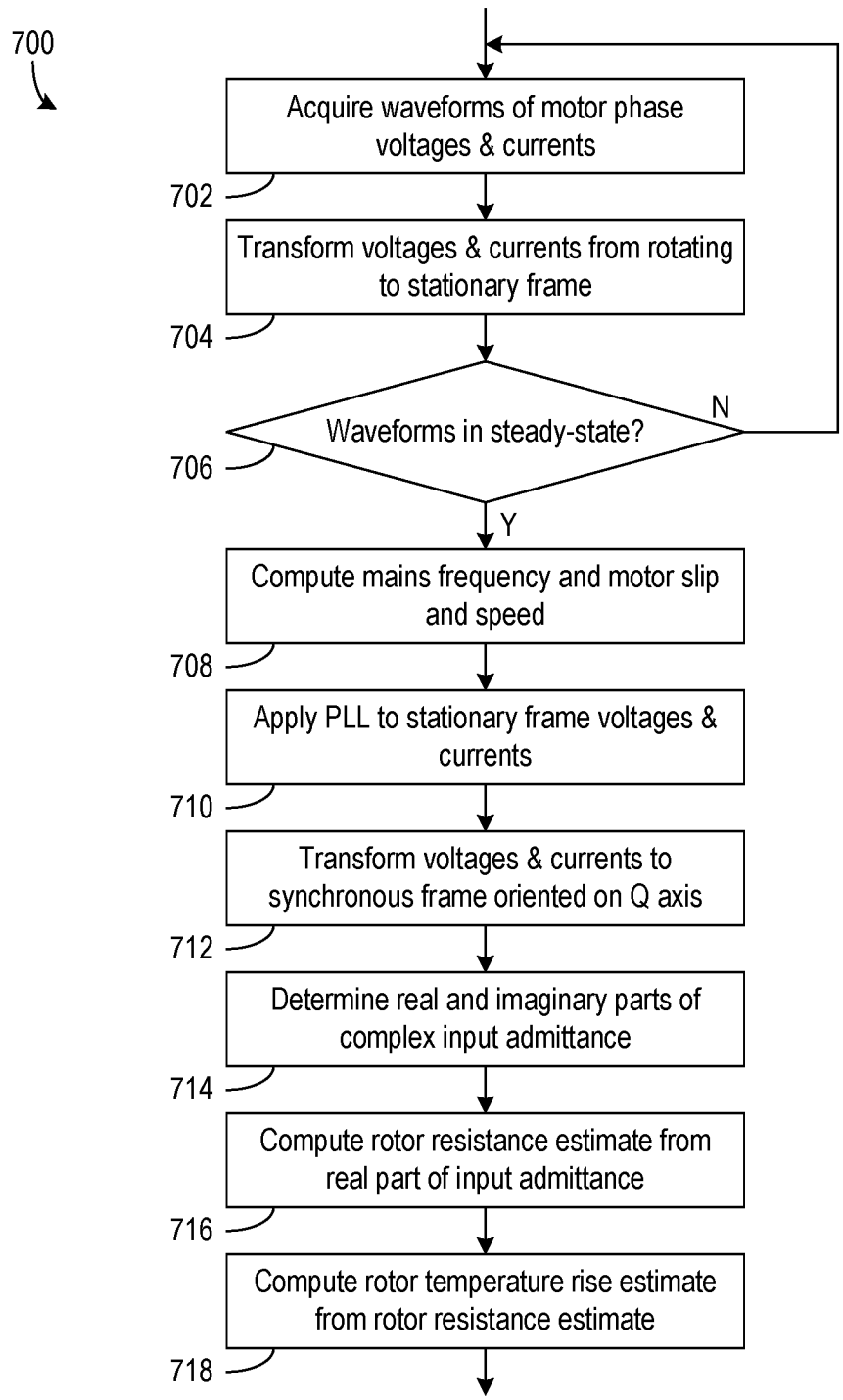
FIG. 7 illustrates a flow chart for an exemplary method of obtaining rotor temperature estimates according to embodiments of the present disclosure.

FIG. 7 shows a flow chart for a method 700 that may be used to compute the rotor temperature rise estimates referenced above in conjunction with the thermal monitor 116. The method 700 generally begins at block 702 where waveforms of the motor phase voltages $V_a$, $V_b$, $V_c$ and currents $I_a$, $I_b$, $I_c$ are captured or otherwise acquired. In some embodiments, the waveforms are captured over a 15-second sampling interval at a sampling rate of 5000 samples/second, although other sampling intervals and sampling rates may certainly be used. In general, the sampling interval and the sampling rate should be sufficiently high to allow rotor slot harmonics to be identified from the motor voltages and currents (see block 708). At block 704, the time-varying voltages and current waveforms (or sampled data therefor) are transformed to the stationary reference frame using the Clarke transformation or similar techniques.

At block 706, a determination is made whether the waveforms have settled to a steady-state condition. If no, then the samples are discarded and the method 700 returns to block 702 for another waveform capture. If yes, then at block 708, the AC mains frequency and the motor slip are computed. In some embodiments, motor slip is obtained by performing an FFT on the motor currents to locate peak frequencies that correspond to rotor slot harmonics, then resolving Equation (5) to determine motor slip s.

At block 710, a PLL or similar computational device is run on or otherwise applied to the stationary reference frame voltages and currents Vx, Vy and Ix, Iy, which has the effect of locking the stationary voltage Vx to the AC mains frequency. The result is, when the stationary reference frame voltages and currents Vx, Vy and Ix, Iy are transformed into the synchronous reference frame at block 712, the voltage vector ($V_Q$, VD) is oriented to the Q-axis of the synchronous reference frame. This leaves the D-axis voltage VD with a zero average value, as depicted in FIG. 4A. There are several definitions of transformations from three-phase variables to stationary two-phase variables, and from there to synchronous frame variables. One such set is shown in Equations (6) and (7):

$$\begin{bmatrix} V_x \\ V_y \end{bmatrix} = \frac{2}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} V_a \\ V_b \\ V_c \end{bmatrix} \quad (7)$$

$$\begin{bmatrix} V_Q \\ V_D \end{bmatrix} = \begin{bmatrix} \cos(\theta) & \sin(\theta) \\ \sin(\theta) & -\cos(\theta) \end{bmatrix} \begin{bmatrix} V_x \\ V_y \end{bmatrix} \quad (8)$$

The synchronous reference frame voltages and current $V_Q$, $V_D$ and $I_Q$, $I_D$ (see FIGS. 4A and 4B) are then used to compute the real and imaginary parts of the motor complex input admittance at block 714 in accordance with Equations (3) and (4). In some embodiments, only the latter half of the waveforms (or sampled data therefor), and preferably only the last four seconds thereof, is used to compute the real and imaginary admittances in order to avoid extraneous noise or interference that can sometimes appear at the front of the waveforms, for example, due to filter settling time.

At block 716, a rotor resistance estimate is computed from the real part of the input admittance in accordance with Equation (2). A rotor temperature rise estimate can then be computed from the rotor resistance estimate at block 718 in accordance with Equation (6). Rotor temperature rise estimates obtained under normal motor operating conditions may then be paired with motor thermal state estimates obtained under normal operating conditions to derive a correlation therebetween that can be used to model rotor temperature rise. As mentioned earlier, the modeling can be performed by the thermal monitor 116 within the overload protection device 110, or it can be performed externally as part of a motor characterization process and the results subsequently provided to the overload protection device 110.

Figure 8:
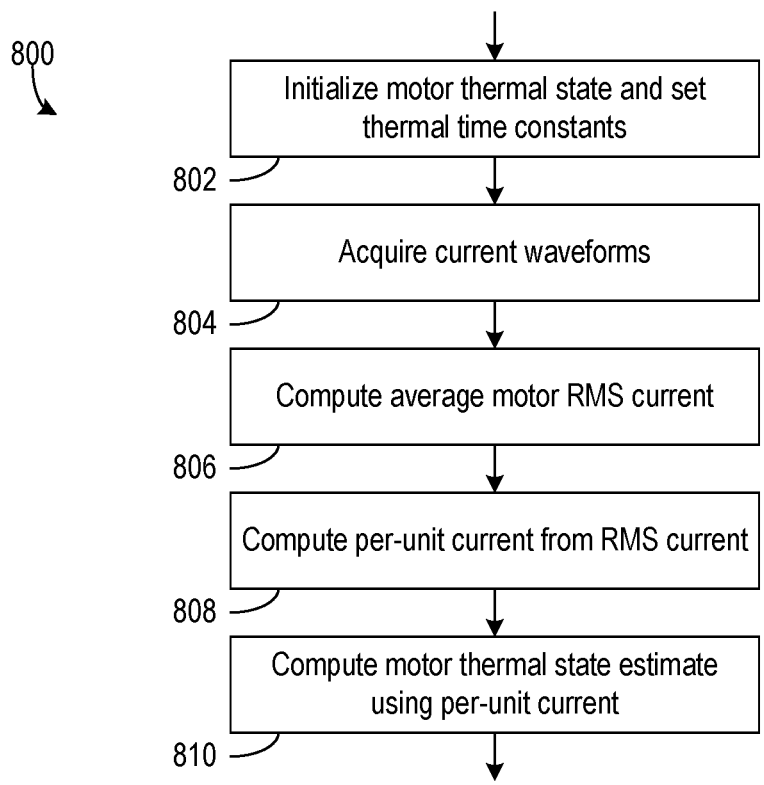
FIG. 8 illustrates a flow chart for an exemplary method of obtaining motor thermal state estimates according to embodiments of the present disclosure.

FIG. 8 shows a flow chart for a method 800 that may be used to compute or otherwise obtain the motor thermal state estimates in conjunction with the thermal monitor 116. Most motor overload protection devices employ a thermal model, typically a first order model, that can be used to estimate motor thermal state. Such models are well known in the art. The thermal state is obtained using the square of the motor RMS current and is typically provided on a normalized per-unit (p.u.) basis, for example, from 0 to 1 p.u. or from 0 to 100 percent.

In the FIG. 8 example, the method 800 generally begins at block 802 where motor thermal state mtrThermState is initialized, for example, by setting mtrThermState equal to zero, and the heating thermal time constant $\tau_{TH}$ for the motor and nominal motor current $I_n$ are defined or otherwise established. At block 804, current waveforms for the motor are captured or otherwise acquired. In some embodiments, three continuous waveforms are captured at a sampling rate of 5000 samples/second, although a different number of waveforms and sampling rate may certainly be used. At block 806, the average motor RMS current $I_{RMS}$ is computed over a 100 ms interval. At block 808, a per-unit current $I_{pu}$ is computed, for example, by dividing the average RMS current by the nominal current, $I_{pu}=I_{RMS}/I_n$ some embodiments, the average RMS current $I_{RMS}$ is updated roughly every 100 ms. At block 810, the motor thermal state mtrThermState is updated, as follows:

If motor is heating: mtrThermState(i)=mtrThermState(j)+(0.1/$\tau_{TH}$)×($I_{pu}^2$−mtrThermState(j))  (9)

If motor is cooling: mtrThermState(i)=mtrThermState(j)+(0.1/coolTCRatio×$\tau_{TH}$)×($I_{pu}^2$−mtrThermState(j))  (10)

In Equation (10), coolTCRatio may be 0.25 (to reflect the fact that heat transfer is less effective when the motor is stopped), mtrThermState(i) is the current thermal state, and mtrThermState(j) is the previous thermal state. Alternatively, the motor thermal state mtrThermState may be defined as mtrThermState(j+1)=mtrThermState(j)+ . . . , where the (j) term represents the previous motor thermal state and the (j+1) term represents an updated motor thermal state. In general, because the thermal model may have a cooling time constant that is different from the heating time constant, the thermal state should be updated roughly every 100 ms to reflect whether the motor is heating (operating) or cooling. These thermal state estimates may then be used to derive a correlation with the rotor temperature rise estimates from above.

Figure 9:
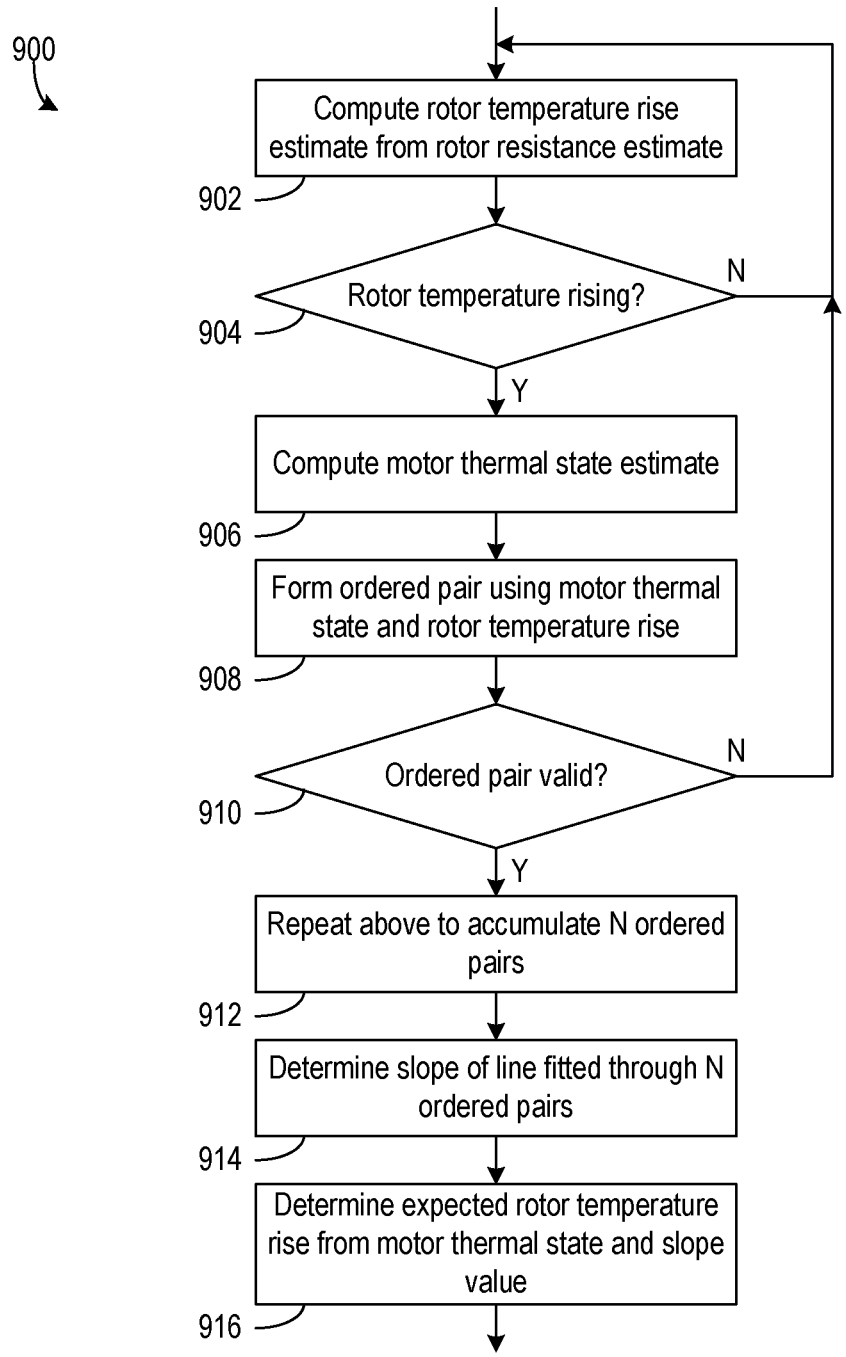
FIG. 9 illustrates a flow chart for an exemplary method of correlating rotor temperature estimates and motor thermal state estimates according to embodiments of the present disclosure.

FIG. 9 shows a flow chart for a method 900 that may be used to derive or compute a correlation between the thermal state estimates and rotor temperature rise estimates in conjunction with the thermal monitor 116. The method 900 generally begins at block 902 where a rotor temperature rise estimate is computed from rotor resistance estimate under normal operating conditions. At block 904, a determination is made whether the rotor temperature rise estimate shows the rotor temperature is increasing (i.e., motor is getting hotter) relative to previous rotor temperature rise estimates. If no (i.e., motor is not getting hotter), then the method 900 returns to block 902 to compute another rotor temperature rise estimate. If yes, then at block 906, a motor thermal state estimate is computed, and at block 908, an ordered pair is formed using the motor thermal state estimate and the rotor temperature rise estimate.

At block 910, a determination is made whether the ordered pair satisfies one or more acceptance criteria or is otherwise valid. The acceptance criteria may include, for example, whether the rotor temperature rise estimate is less than a predefined minimum (e.g., 40 degrees Kelvin), and whether the thermal state estimate is less than a predefined minimum (e.g., 0.4 p.u.). Depending on the particular application, if either criterion or both criteria are not satisfied, meaning the motor is not heating significantly, then the method 900 returns to block 902 to compute another rotor temperature rise estimate. If either criterion or both criteria are satisfied, again depending on the particular application, then at block 912, the above process is repeated until a predefined number N of ordered pairs have been accumulated. In some embodiments, at least 25 ordered pairs are needed (i.e., N 25), but fewer or more ordered pairs may be used depending on the particular application.

At block 914, a correlation between the thermal state estimates and rotor temperature rise estimates is derived or otherwise computed by plotting the ordered pairs and determining the slope of a straight-line segment fitted through the plotted pairs. The slope can then be used to model rotor temperature rise for the motor under normal operating condition at block 916. For example, for a given thermal state, the expected rotor temperature rise corresponding to that thermal state can be computed using the standard linear equation y=mx+b, where m is the slope of the line and b is the y-intercept, as follows:

$$T_{rise,expected} = slope \times mtrThermState + offset \quad (11)$$

Figure 10:
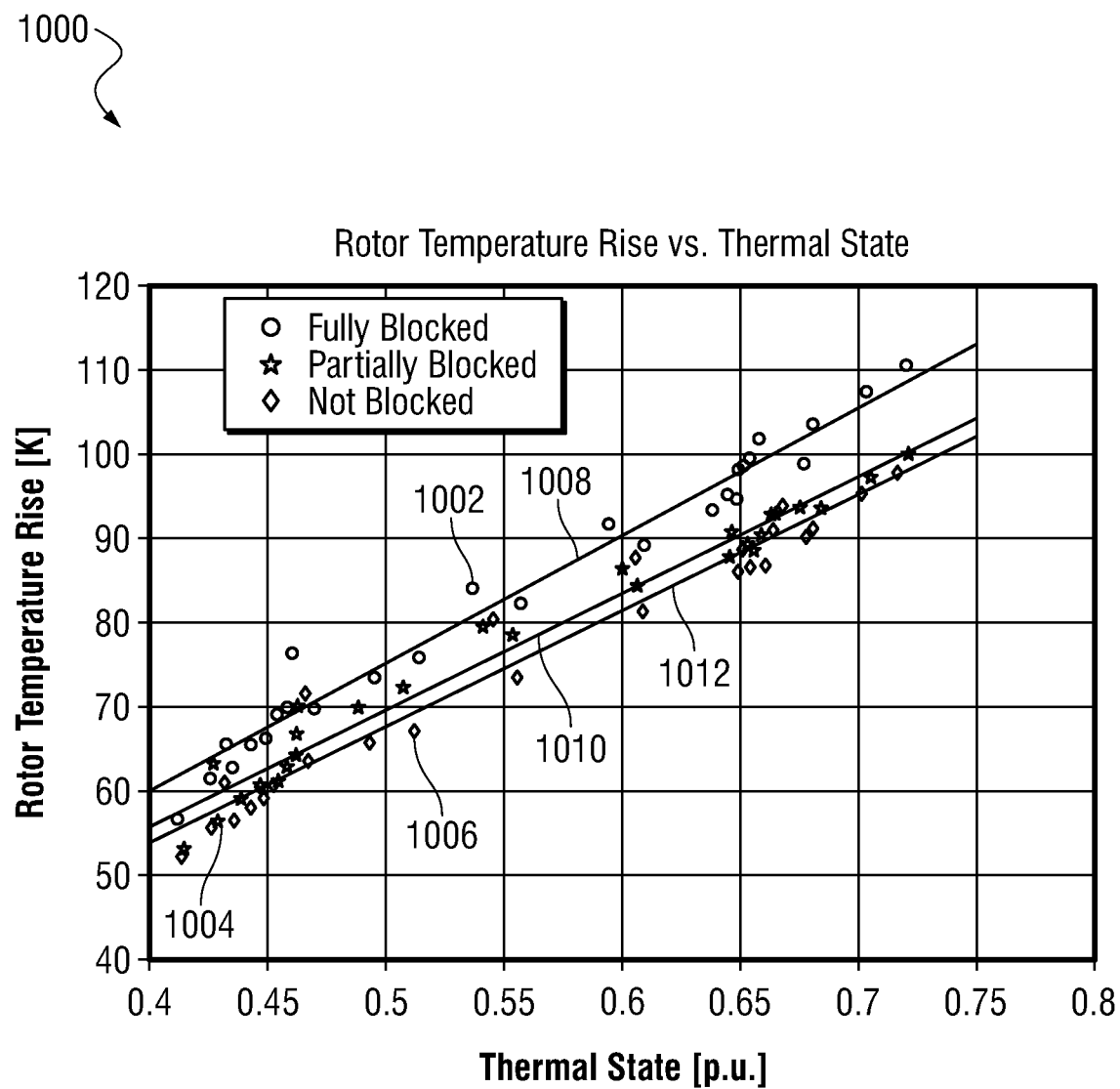
FIG. 10 illustrates a graph of exemplary rotor temperature rise versus thermal state and corresponding line slopes according to embodiments of the disclosure.

FIG. 10 shows a graph 1000 illustrating an exemplary correlation between the thermal state estimates and rotor temperature rise estimates. In the graph, the horizontal axis represents thermal states and the vertical axis represents rotor temperature rise estimates. Data points 1002, 1004, and 1006, represent ordered pairs of thermal states and rotor temperature rise estimates for a motor having a fully blocked, partially blocked, and unblocked fan, respectively, while lines 1008, 1010, and 1012 are lines fitted through the fully blocked, partially blocked, and unblocked data points. A clear separation can be seen between the different lines 1008, 1010, and 1012 without any crossover, thus confirming the feasibility of using the slope of the lines to predict rotor temperature rise for given thermal state. The slope of the line 1012 fitted through the unblocked data points can then be used to model expected rotor temperature rise under normal motor operating conditions. In a preferred embodiment, the data points should not be clustered together, but should span at least 0.2 p.u. along the thermal state axis to provide more accurate slopes.

Figure 11:
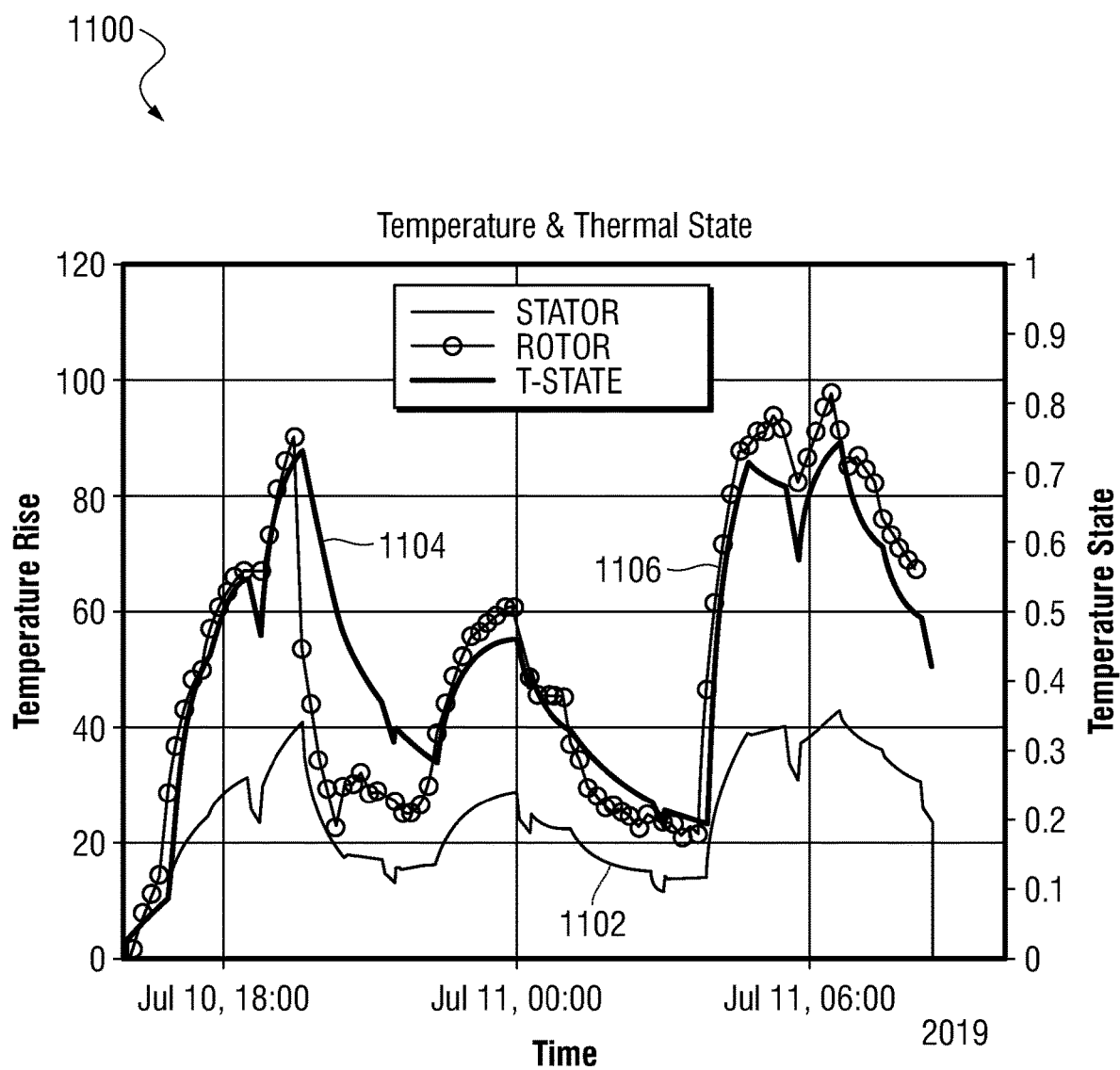
FIG. 11 illustrates a graph of measured stator winding temperature rise, exemplary rotor temperature rise, and computed thermal state, all versus time, for an unobstructed fan according to embodiments of the disclosure.

FIG. 11 shows a graph 1100 of measured stator winding temperature rise, exemplary rotor temperature rise, and computed motor thermal state for an unblocked fan in accordance with embodiments of the present disclosure. In the graph, the horizontal axis represents time (hours), the left axis represents temperature rise (degrees Celsius), and the right axis represents thermal state (p.u.). Line 1102 represents stator temperature rise, line 1104 represents motor thermal state, and line 1106 represents rotor temperature rise. Data was acquired over an 18-hour period. As can be seen, the line 1106 representing rotor temperature rise substantially tracks the line 1104 representing motor thermal state.

Figure 12:
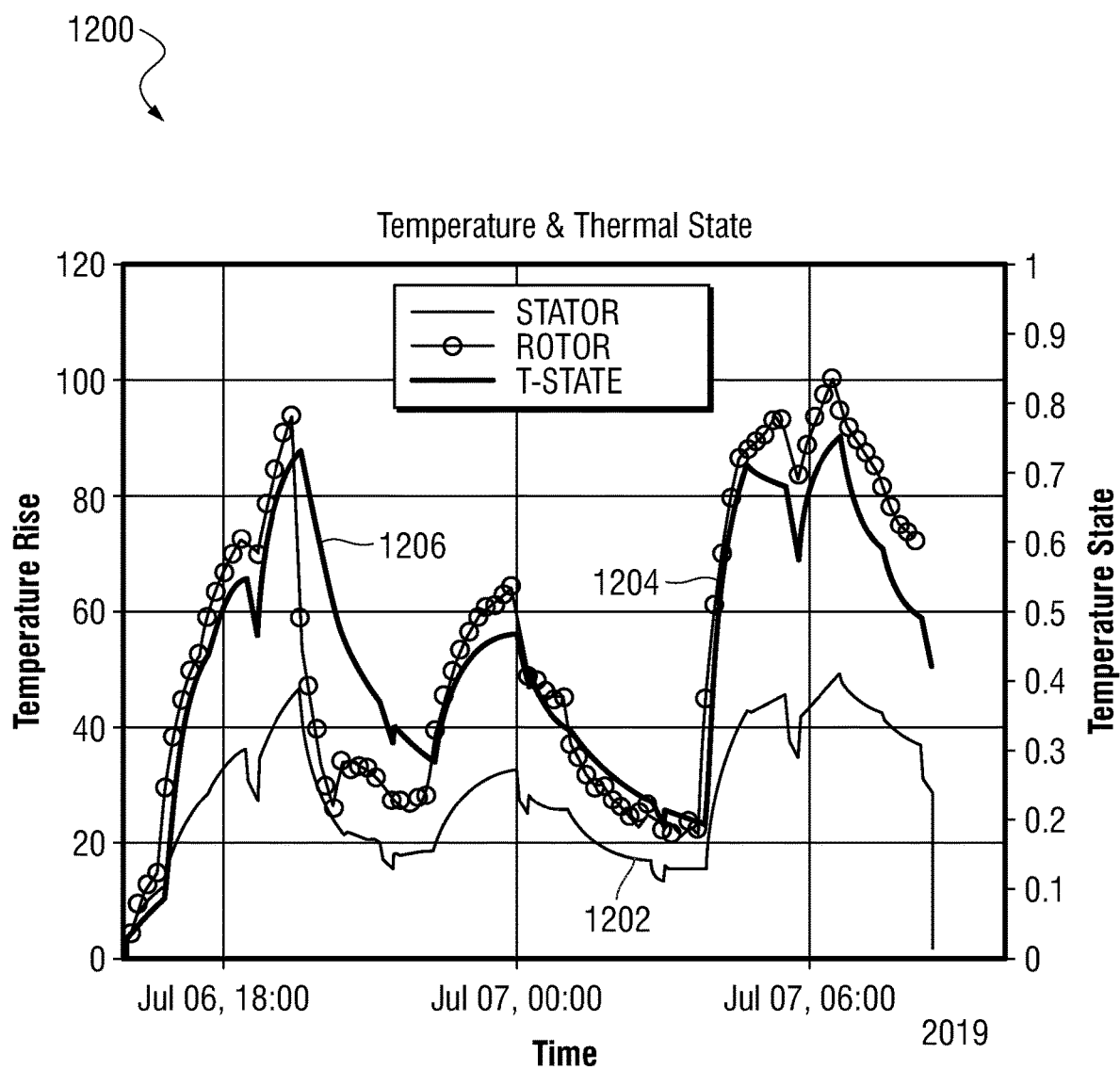
FIG. 12 illustrates a graph of measured stator winding temperature rise, exemplary rotor temperature rise, and computed thermal state, all versus time for a partly obstructed fan according to embodiments of the disclosure.

FIG. 12 shows another graph 1200 similar to the graph 1100 of FIG. 11 except this time the fan is partially blocked. Line 1202 represents stator temperature rise, line 1204 represents motor thermal state, and line 1206 represents rotor temperature rise. In this example, the line 1204 representing motor thermal state has not changed, but the line 1206 representing rotor temperature rise has increased relative to the line 1106 from FIG. 11 due to the reduction in cooling air over the rotor. If the difference is more than a first predefined threshold for example, then the motor may be experiencing the beginnings of a thermal overload condition. In that case, the thermal monitor 116 may simply issue alarm.

Figure 13:
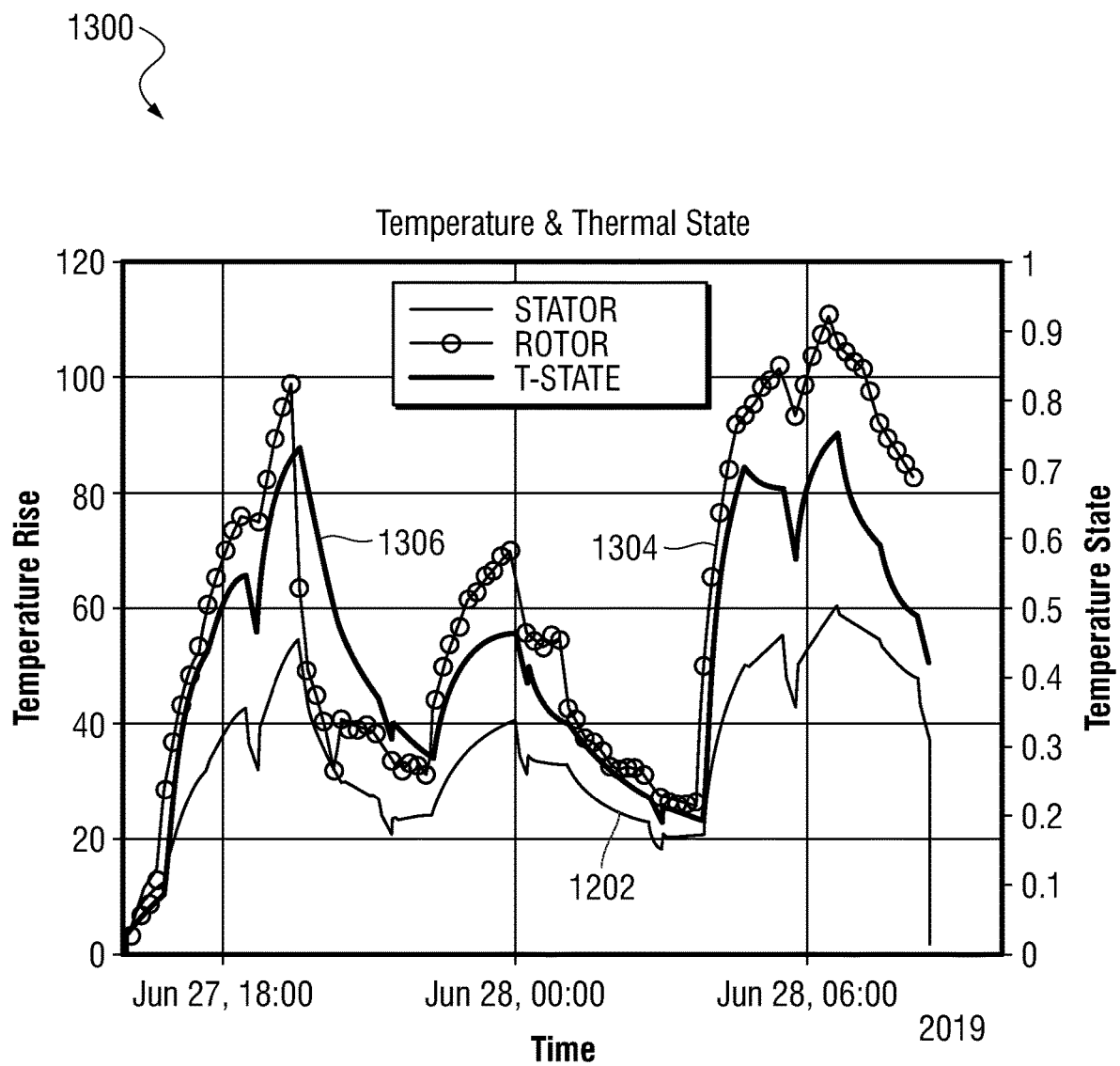
FIG. 13 illustrates a graph of measured stator winding temperature rise, exemplary rotor temperature rise, and computed thermal state, all versus time for a fully unobstructed fan according to embodiments of the disclosure.

FIG. 13 shows yet another graph 1300 similar to the graph 1100 of FIG. 11 except this time the fan is completely blocked. Line 1302 represents stator temperature rise, line 1304 represents motor thermal state, and line 1306 represents rotor temperature rise. Again, the line 1304 representing motor thermal state has not changed, but the line 1306 representing rotor temperature rise has increased substantially relative to the line 1106 from FIG. 11 due to the significant reduction in cooling air over the rotor. If the difference is more than a second predefined threshold for example, then the motor may be in the midst of a thermal overload condition. In that case, the thermal monitor may take one or more corrective actions, including cutting power to the motor, issuing alarm, and the like.

In the preceding discussion, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a private area network (PAN), local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein, but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

I claim:

1. A method of protecting an induction motor from thermal overload conditions, comprising:
   computing rotor temperature rise estimates from rotor resistance estimates for the induction motor;
   computing motor thermal state estimates for the induction motor;
   deriving a correlation between the thermal state estimates and the rotor temperature rise estimates;
   computing a new temperature rise estimate from a new rotor resistance estimate for the induction motor;
   computing a new motor thermal state estimate for the induction motor;
   computing an expected rotor temperature rise for the induction motor using the correlation and the new motor thermal state;
   checking whether the new temperature rise estimate exceeds the expected rotor temperature rise by more than a predefined threshold rotor temperature rise for the induction motor; and
   performing a corrective action in response to the new temperature rise estimate exceeding the expected rotor temperature rise by more than the predefined threshold rotor temperature rise.

2. The method of claim 1, further comprising obtaining the rotor resistance estimates from a real part of a complex motor input admittance and a slip value of the induction motor.

3. The method of claim 2, further comprising determining the complex motor input admittance from motor voltage and current in a synchronous reference frame with the motor voltage oriented on a Q-axis of the synchronous reference frame.

4. The method of claim 1, wherein deriving the correlation comprises fitting a line to a plurality of points, each point defined by an ordered pair composed of a rotor temperature rise estimate and a corresponding motor thermal state estimate, and determining a slope of the line.

5. The method of claim 4, wherein computing an expected rotor temperature rise for the induction motor comprises applying the slope to the new motor thermal estimate.

6. The method of claim 1, wherein performing a corrective action comprises one or more of: cutting power to the induction motor and issuing an alarm.

7. The method of claim 1, wherein computing an expected rotor temperature rise for the induction motor is performed in one of: a motor overload protection device or an edge device.

8. A device for protecting an induction motor from thermal overload conditions, comprising:
   a processor;
   a storage unit communicatively coupled to the processor, the storage unit storing computer-readable instructions thereon for causing the processor to:
   compute a temperature rise estimate from a rotor resistance estimate for the induction motor;
   compute a motor thermal state estimate for the induction motor;
   compute an expected rotor temperature rise for the induction motor;
   check whether the temperature rise estimate exceeds the expected rotor temperature rise by more than a predefined threshold rotor temperature rise for the induction motor; and
   perform a corrective action in response to the temperature rise estimate exceeding the expected rotor temperature rise by more than the predefined threshold rotor temperature rise.

9. The device of claim 8, wherein the computer-readable instructions further cause the processor to obtain the rotor resistance estimate from a real part of a complex motor input admittance and a slip value of the induction motor.

10. The device of claim 9, wherein the computer-readable instructions further cause the processor to determine the complex motor input admittance from motor voltage and current in a synchronous reference frame with the motor voltage oriented on a Q-axis of the synchronous reference frame.

11. The device of claim 8, wherein the computer-readable instructions further cause the processor to derive a correlation between thermal state estimates and rotor temperature rise estimates for the induction motor.

12. The device of claim 11, wherein the computer-readable instructions further cause the processor to compute the expected rotor temperature rise by applying the correlation to the motor thermal estimate.

13. The device of claim 8, wherein the processor performs the corrective action by performing one or more of: cutting power to the induction motor and issuing an alarm.

14. The device of claim 8, wherein the device is one of: a motor overload protection device or an edge device.

15. A non-transitory computer-readable medium containing program logic that, when executed by operation of one or more computer processors, causes the one or more computer processors to:
   compute rotor temperature rise estimates from rotor resistance estimates for an induction motor;
   compute motor thermal state estimates for the induction motor;
   derive a correlation between the thermal state estimates and the rotor temperature rise estimates;
   compute a new motor thermal state estimate for the induction motor;
   compute an expected rotor temperature rise for the induction motor using the correlation and the new motor thermal state;
   check whether the new temperature rise estimate exceeds the expected rotor temperature rise by more than a predefined threshold rotor temperature rise for the induction motor; and
   perform a corrective action in response to the new temperature rise estimate exceeding the expected rotor temperature rise by more than the predefined threshold rotor temperature rise.

16. The computer-readable medium of claim 15, wherein the program logic further causes the one or more processors to obtain the rotor resistance estimates from a real part of a complex motor input admittance and a slip value of the induction motor.

17. The computer-readable medium of claim 16, wherein the program logic further causes the one or more processors to determine the complex motor input admittance from motor voltage and current in a synchronous reference frame with the motor voltage oriented on a Q-axis of the synchronous reference frame.

18. The computer-readable medium of claim 15, wherein the correlation is derived by fitting a line to a plurality of points, each point defined by an ordered pair composed of a rotor temperature rise estimate and a corresponding motor thermal state estimate, and determining a slope of the line.

19. The computer-readable medium of claim 18, wherein the one or more processors compute the expected rotor temperature rise for the induction motor by applying the slope to the new motor thermal estimate.

20. The computer-readable medium of claim 15, wherein the one or more processors perform the corrective action by performing one or more of: cutting power to the induction motor and issuing an alarm.

* * * * *